US009348173B2

(12) United States Patent
Liu et al.

(10) Patent No.: US 9,348,173 B2
(45) Date of Patent: May 24, 2016

(54) LIGHT SOURCE MODULE

(71) Applicants:Hung-Wei Liu, Hsin-Chu (TW);
Chin-Ku Liu, Hsin-Chu (TW)

(72) Inventors: Hung-Wei Liu, Hsin-Chu (TW);
Chin-Ku Liu, Hsin-Chu (TW)

(73) Assignee: Young Lighting Technology Inc.,
Hsin-Chu (TW)

( * ) Notice: Subject to any disclaimer, the term of this patent is extended or adjusted under 35 U.S.C. 154(b) by 214 days.

(21) Appl. No.: 14/328,706

(22) Filed: Jul. 11, 2014

(65) Prior Publication Data
US 2015/0103522 A1    Apr. 16, 2015

(30) Foreign Application Priority Data
Oct. 12, 2013    (CN) .......................... 2013 1 0475712

(51) Int. Cl.
*G02F 1/01* (2006.01)
*G02F 1/1335* (2006.01)
*G02B 3/00* (2006.01)

(52) U.S. Cl.
CPC ............ *G02F 1/133605* (2013.01); *G02B 3/00* (2013.01); *G02F 1/133603* (2013.01)

(58) Field of Classification Search
CPC ..................... G02F 1/133603; G02F 1/133605
USPC .................................................... 362/217.05
See application file for complete search history.

(56) References Cited

U.S. PATENT DOCUMENTS

| 2006/0152932 | A1* | 7/2006 | Wu ........................... F21V 5/04 362/327 |
| 2006/0249742 | A1* | 11/2006 | Noh .................... G02F 1/133603 257/98 |
| 2008/0101086 | A1* | 5/2008 | Lee .................... G02F 1/133605 362/615 |
| 2010/0201911 | A1* | 8/2010 | Iiyama ............... G02F 1/133603 349/61 |
| 2014/0286000 | A1* | 9/2014 | Cho ................... G02F 1/133606 362/97.1 |
| 2015/0159834 | A1* | 6/2015 | Chang ................. G02F 1/33606 362/97.1 |
| 2015/0292708 | A1* | 10/2015 | Park ....................... F21V 5/007 362/97.1 |

FOREIGN PATENT DOCUMENTS

| CN | 2729530 | 9/2005 |
| CN | 100389349 | 5/2008 |
| CN | 101418929 | 4/2011 |
| TW | I256505 | 6/2006 |
| TW | I366039 | 6/2012 |

* cited by examiner

*Primary Examiner* — Nimeshkumar Patel
*Assistant Examiner* — Christopher Raabe
(74) *Attorney, Agent, or Firm* — Jianq Chyun IP Office

(57) ABSTRACT

A light source module includes at least one light bar, a reflector, and at least one bar-shaped reflection unit. The light bar includes light-emitting elements arranged along an extension direction. The reflector has at least one accommodation space accommodating the light bar and reflective convex surfaces located on two opposite sides of the light bar. The bar-shaped reflection unit is located above the light bar, extends along the extension direction, and has a reflection surface facing the light bar. A cross-sectional line obtained by cutting the reflection surface along an optical axis of any of the light-emitting elements and along a direction perpendicular to the extension direction includes a convex arc line protruding toward the light-emitting elements and two concave arc lines connected to two opposite sides of the convex arc line.

20 Claims, 10 Drawing Sheets

LIGHT SOURCE MODULE

CROSS-REFERENCE TO RELATED APPLICATION

This application claims the priority benefit of China application serial no. 201310475712.4, filed on Oct. 12, 2013. The entirety of the above-mentioned patent application is hereby incorporated by reference herein and made a part of this specification.

BACKGROUND OF THE INVENTION

1. Field of the Invention

The invention relates to an optical module; more particularly, the invention relates to a light source module.

2. Description of Related Art

In recent years, due to the advancement of the light-emitting efficiency and the increase in the service life, light-emitting diodes (LED) characterized by low power consumption, low pollution, high efficiency, fast response speed, compactness, light weight, and capability of being arranged on different types of surfaces have been extensively employed in the optical industry. The LED can normally serve as the light source in a variety of illumination apparatuses and flat panel displays utilized in daily lives, such as liquid crystal displays (LCD).

For instance, the backlight module of the LCD is a planar light source capable of providing evenly distributed illumination, where the basic principle is converting effective light from a linear light source or a point light source to the planar light source with high luminosity and high uniformity. Based on where the light source is located, the light source module may be categorized into a side-incident type and a direct type. Since the direct type backlight module has the simple structure and can have plural sets of light sources, the direct type backlight module is able to provide higher brightness and luminance and thus is often used in electronic products with large LCDs.

The existing direct type backlight module often makes use of secondary optical lenses to reduce the number of LEDs or lower the height of the optical cavity; however, the relevant costs may be correspondingly raised. Another conventional direct type backlight module does not require any secondary optical lens but requires the relatively thick optical cavity or more LEDs, thus lessening the reliability of the entire system.

China Patent No. 101418929B discloses a wide backlight source module featuring uniform distribution. China Patent No. 100389349C discloses a backlight module that includes a casing, a light source, and a reflector. China Patent No. 2729530Y discloses an opaque light shielding plate that has a reflection surface. Taiwan Patent No. I366039B1 discloses a direct type backlight module that includes a base, a plurality of light sources, and a transparent plate. Taiwan Patent No. 1256505 discloses a direct type backlight module that is constituted by a base, a plurality of point light sources, and a light mixing plate.

SUMMARY OF THE INVENTION

The invention is directed to a light source module characterized by a thin optical cavity and low costs.

Other advantages of the invention are further illustrated by the technical features disclosed in the invention.

In order to achieve one, a part of, or all of the above objectives, or other objectives, an embodiment of the invention provides a light source module. The light source module includes at least one light bar, a reflector, and at least one bar-shaped reflection unit. The light bar includes a plurality of light-emitting elements arranged along an extension direction. The reflector has at least one accommodation space that accommodates the at least one light bar and a plurality of reflective convex surfaces located on two opposite sides of the light bar. The at least one bar-shaped reflection unit is located above the at least one light bar, extends along the extension direction, and has a reflection surface facing the light bar. A cross-sectional line obtained by cutting the reflection surface of the at least one bar-shaped reflection unit along an optical axis of any of the light-emitting elements and along a direction perpendicular to the extension direction includes a convex arc line and two concave arc lines. The convex arc line protrudes toward the light-emitting elements. The two concave arc lines are connected to two opposite ends of the convex arc line.

According to an embodiment of the invention, a ratio of a width of the cross-sectional line along a direction perpendicular to the optical axis to a width of a light-emitting zone of the light-emitting elements along the direction perpendicular to the extension direction is larger than 2 and smaller than 7.

According to an embodiment of the invention, the light bar further includes a bar-shaped substrate. The bar-shaped substrate extends along the extension direction and holds the light-emitting elements, and a width of the bar-shaped substrate along the direction perpendicular to the extension direction is greater than a width of the bar-shaped reflection unit along the direction perpendicular to the extension direction.

According to an embodiment of the invention, an included angle between two connection lines respectively connecting an apex of the convex arc line to two opposite ends of the cross-sectional line is greater than or substantially equal to an included angle between two connection lines respectively connecting the apex of the convex arc line to two opposite half height waist points of the cross-sectional line, and a distance from each of the opposite half height waist points to the apex in a direction parallel to the optical axis is substantially equal to a distance from each of the opposite half height waist points to the two opposite ends of the cross-sectional line in the direction parallel to the optical axis.

According to an embodiment of the invention, an included angle between two connection lines respectively connecting an apex of the convex arc line to two opposite ends of the cross-sectional line is larger than 120 degrees and smaller than 150 degrees.

According to an embodiment of the invention, an included angle between two connection lines respectively connecting an apex of the convex arc line to two opposite half height waist points of the cross-sectional line is larger than 100 degrees and smaller than 150 degrees, and a distance from each of the opposite half height waist points to the apex in a direction parallel to the optical axis is substantially equal to a distance from each of the opposite half height waist points to the two opposite ends of the cross-sectional line in the direction parallel to the optical axis.

According to an embodiment of the invention, an included angle between the optical axis and a tangent line of an end on the reflective convex surface of the reflector closest to the light bar is larger than 0 degree and smaller than 45 degrees and the tangent line is on a reference plane perpendicular to the extension direction.

According to an embodiment of the invention, the light bar further includes a bar-shaped substrate. The bar-shaped substrate extends along the extension direction and holds the light-emitting elements.

According to an embodiment of the invention, the bar-shaped substrate has a first surface facing the bar-shaped reflection unit and a second surface facing away from the bar-shaped reflection unit. The reflector has a wavy reflective curved surface. The wavy reflective curved surface includes the reflective convex surfaces and a plurality of reflective concave surfaces, and a height of the first surface of the bar-shaped substrate in a direction parallel to the optical axis is within a range between a height of a lowest point of the wavy reflective curved surface in the direction parallel to the optical axis and a height of the second surface of the bar-shaped substrate in the direction parallel to the optical axis or is substantially equal to the height of the lowest point of the wavy reflective curved surface in the direction parallel to the optical axis.

According to an embodiment of the invention, the light source module further includes an optical film, and the bar-shaped reflection unit is located between the optical film and the light bar.

According to an embodiment of the invention, a distance from the bar-shaped reflection unit to the optical film is greater than one third of a distance from the bar-shaped substrate to the optical film.

According to an embodiment of the invention, the reflector further has two reflective concave surfaces connected to the two opposite sides of the light bar. Each of the reflective concave surfaces is connected between one of the reflective convex surfaces and the light bar, an included angle between the optical axis and a tangent line of a junction of each of the reflective concave surfaces and the corresponding reflective convex surface is larger than 45 degrees and smaller than 70 degrees, and the tangent line is on a reference plane perpendicular to the extension direction.

According to an embodiment of the invention, the light bar further includes a bar-shaped substrate. The bar-shaped substrate extends along the extension direction and holds the light-emitting elements, and a width of the bar-shaped substrate along the direction perpendicular to the extension direction is smaller than a width of the bar-shaped reflection unit along the direction perpendicular to the extension direction.

According to an embodiment of the invention, the reflector has a wavy reflective curved surface. The wavy reflective curved surface includes the reflective convex surfaces and a plurality of reflective concave surfaces, and the wavy reflective curved surface has at least one ridge line. The ridge line has a plurality of protrusions arranged along the extension direction, and each of the protrusions is located between two reference planes which pass two adjacent light-emitting elements and stand perpendicular to the extension direction.

According to an embodiment of the invention, the reflector has a wavy reflective curved surface and at least one edge curved surface. The wavy reflective curved surface includes the reflective convex surfaces and a plurality of reflective concave surfaces. The at least one edge curved surface extends perpendicularly to the extension direction, connected to a side of the wavy reflective curved surface and located next to an end of the light bar in an elongate direction. A portion of the edge curved surface corresponding to the end of the light bar is a concave curved surface.

According to an embodiment of the invention, the accommodation space is an accommodation recess or an accommodation opening.

According to an embodiment of the invention, the light source module further includes a plurality of support units. The support units are connected to the light bar and the bar-shaped reflection unit, and each of the support units is located between two adjacent light-emitting elements.

According to an embodiment of the invention, the number of the at least one light bar is plural, and the number of the at least one bar-shaped reflection unit is plural. The light bars are arranged along the direction perpendicular to the extension direction, and the bar-shaped reflection units are also arranged along the direction perpendicular to the extension direction.

According to an embodiment of the invention, the light source module further includes a control unit. The control unit is electrically connected to the light bars and configured to regionally adjust brightness of the light-emitting elements in different regions of the light bars.

According to an embodiment of the invention, the reflection surface of the bar-shaped reflection unit is a specular reflection surface. The reflector has a wavy reflective curved surface. The wavy reflective curved surface includes the reflective convex surfaces and a plurality of reflective concave surfaces, and the wavy reflective curved surface is a diffusive reflection surface.

In view of the above, the light source module described in the embodiments of the invention may have at least one of the following advantages. The reflection angle of light is determined by means of the reflection surface of the bar-shaped reflection unit in the light source module described herein, such that the light emitted from the light-emitting elements is distributed onto the reflector. Besides, through the structural design of the wavy reflective curved surface of the reflector, the intensity and distribution of light emitted from the light source module may be adjusted; hence, in case of the thin optical cavity, the uniformity of the light distribution and favorable light intensity are ensured, and the light provided by the light-emitting elements is converted into the planar light source with high brightness and uniform distribution. Moreover, owing to the control unit, the brightness of the light-emitting elements in different regions of the light bars is regionally adjusted, such that the light source module described herein is capable of performing a local dimming function. In another aspect, the structural design of the reflection surface of the bar-shaped reflection unit and the wavy reflective curved surface of the reflector allows the light source module to have the improved overall brightness and uniform light distribution. At the same time, the number of the required light bars can be reduced, or the distance among the light bars is not required to be small. Furthermore, when the overall brightness and the uniformity of light distribution of the light source are improved, the number of the required light-emitting elements can be reduced, and the distance among the light-emitting elements is not required to be small. Thereby, the product costs may be lowered down.

Other features and advantages of the invention will be further understood from the further technological features disclosed by the embodiments of the invention wherein there are shown and described embodiments of this invention, simply by way of illustration of modes best suited to carry out the invention.

BRIEF DESCRIPTION OF THE DRAWINGS

To make the above features and advantages of the invention more comprehensible, several embodiments accompanied with drawings are described in detail as follows.

DESCRIPTION OF EMBODIMENTS

In the following detailed description of the exemplary embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
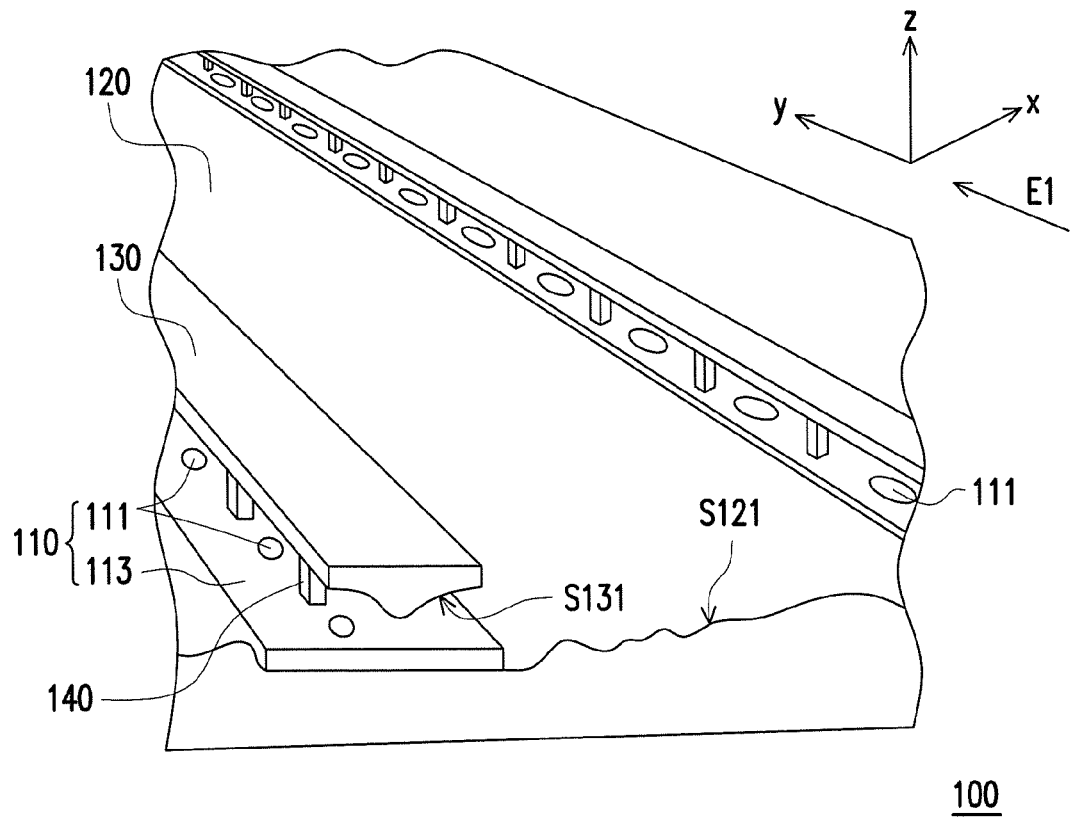
FIG. 1A is a schematic three-dimensional diagram illustrating a portion of a light source module according to an embodiment of the invention.
Figure 1B:
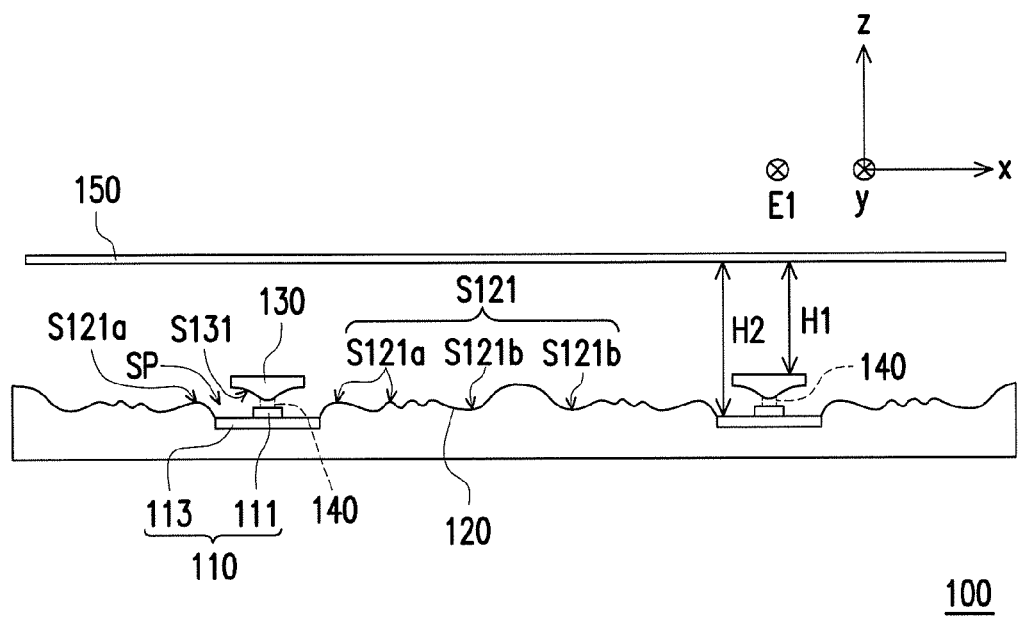
FIG. 1B is a schematic cross-sectional diagram illustrating the light source module depicted in FIG. 1A.

FIG. 1A is a schematic three-dimensional diagram illustrating a portion of a light source module according to an embodiment of the invention. FIG. 1B is a schematic cross-sectional diagram illustrating the light source module depicted in FIG. 1A. With reference to FIG. 1A, the light source module 100 includes at least one light bar 110, a reflector 120, and at least one bar-shaped reflection unit 130. The light bar 110 includes a plurality of light-emitting elements 111 arranged along an extension direction E1 and a bar-shaped substrate 113. The bar-shaped substrate 113 extends along the extension direction E1 and holds the light-emitting elements 111. In the embodiment, the light-emitting elements 111 may be light-emitting diodes (LED), for instance. Moreover, in this embodiment, the extension direction E1 is, for instance, a y direction. To be specific, in the embodiment, the number of the at least one light bar 110 is plural, and so is the number of the at least one bar-shaped reflection unit 130. The light bars 110 are arranged along a direction substantially perpendicular to the extension direction E1, and the bar-shaped reflection units 130 are also arranged along the direction substantially perpendicular to the extension direction E1.

As shown in FIG. 1A, in the embodiment, the light source module 100 further includes a plurality of support units 140. The support units 140 are connected to the light bars 110 and the bar-shaped reflection units 130, so as to support the bar-shaped reflection units 130 to be configured on the light bars 110 and maintain a fixed distance between the light bars 110 and the bar-shaped reflection units 130. Each of the support units 140 is located between two adjacent light-emitting elements 111, which should however not be construed as a limitation to the invention. In another embodiment, the support units 140 may be connected to a frame (not shown) of the light source module 100 and simultaneously support the bar-shaped reflection units 130 to be configured on the light bars 110.

Besides, as shown in FIG. 1B, the reflector 120 has at least one accommodation space SP that accommodates at least one light bar 110 and a plurality of reflective convex surfaces S121a located on two opposite sides of the light bar 110. Particularly, in the embodiment, the accommodation space SP is an accommodation recess where the light bar 110 is located. The reflector 120 has a wavy reflective curved surface S121. The wavy reflective curved surface S121 includes the reflective convex surfaces S121a and a plurality of reflective concave surfaces S121b, and the wavy reflective curved surface S121 is a diffusive reflection surface. For instance, in the embodiment, the reflector 120 may be a white reflector.

With reference to FIG. 1A and FIG. 1B, in the embodiment, at least one bar-shaped reflection unit 130 is located above at least one light bar 110, extends along the extension direction E1, and has a reflection surface S131 facing the light bar 110. The reflection surface S131 of the bar-shaped reflection unit 130 is a specular reflection surface according to the embodiment. For instance, the reflection surface S131 of the bar-shaped reflection unit 130 may be &limed by coating, and the coating material may be a dielectric material, silver, aluminum, or any other appropriate material capable of reflecting light. The reflection surface S131 of the bar-shaped reflection unit 130 may also be formed by adhering a silver reflector, an aluminum reflector, or an enhanced specular reflector with ultra-high reflectivity, and the invention is not limited thereto.

As shown in FIG. 1B, in the embodiment of the invention, the light source module 100 further includes an optical film 150, and the bar-shaped reflection unit 130 is located between the optical film 150 and the light bar 110. The optical film 150 described in the embodiment is a diffuser plate, while the invention is not limited thereto; in other embodiments of the invention, the optical film 150 may also be a diffuser plate, a prism, a diffuser sheet, or a combination thereof. Specifically, in the embodiment, a distance H1 from the bar-shaped reflection unit 130 to the optical film 150 is greater than one third of a distance H2 from the bar-shaped substrate 113 to the optical film 150. For instance, the distance H2 from the bar-shaped substrate 113 to the optical film 150 is smaller than or substantially equal to 10 mm in the embodiment. That is, the thickness of the optical cavity of the light source module 100 is smaller than or substantially equal to 10 mm in the embodiment, so as to achieve the structural design of the thin optical cavity. Note that the numerical range provided here is exemplary and is not intended to limit the scope of the invention. The detailed structure of the light source module 100 will be elaborated with reference to FIG. 1C and FIG. 1D.

Figure 1C:
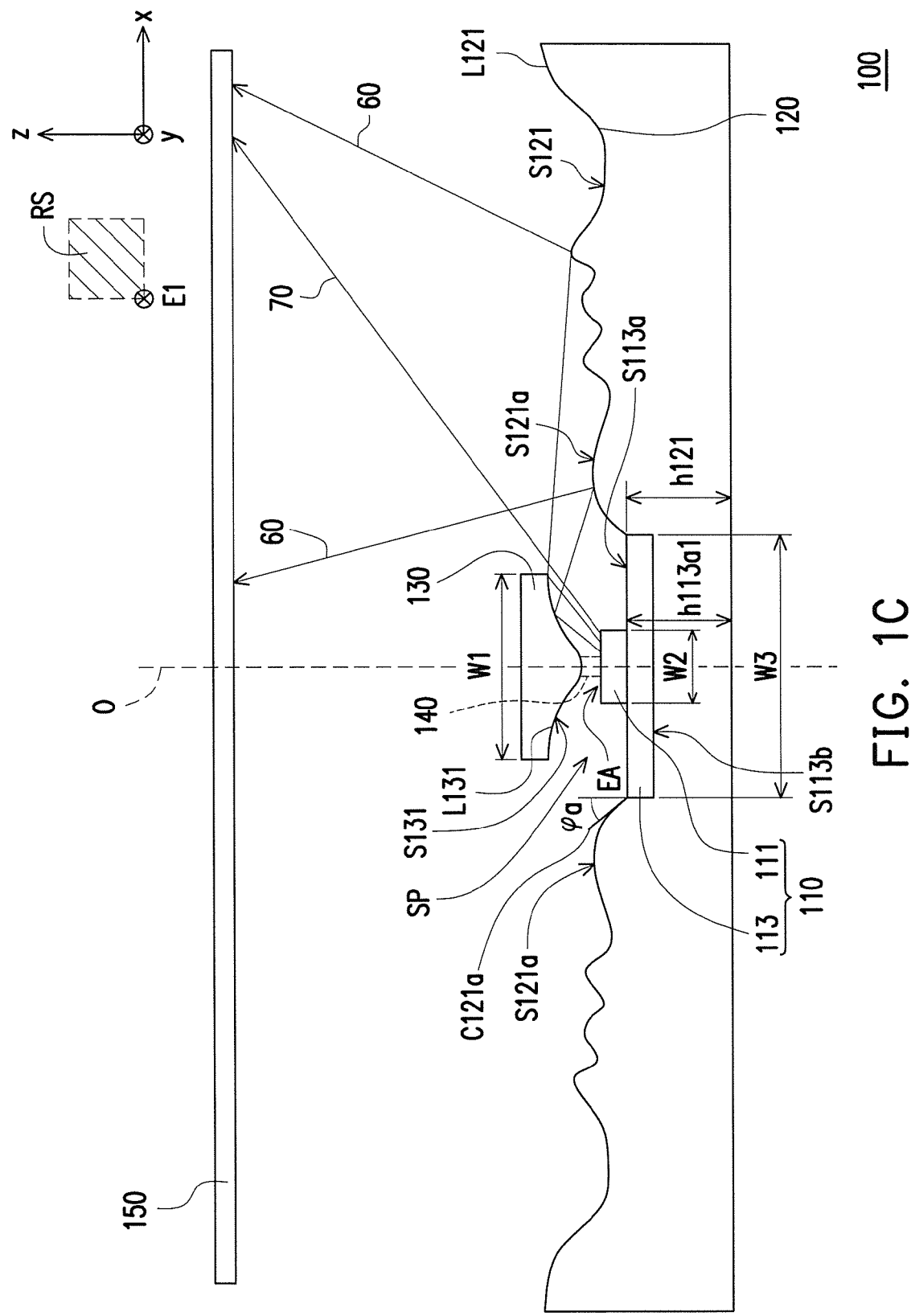
FIG. 1C is a schematic diagram illustrating a light path of the light source module depicted in FIG. 1A.
Figure 1D:
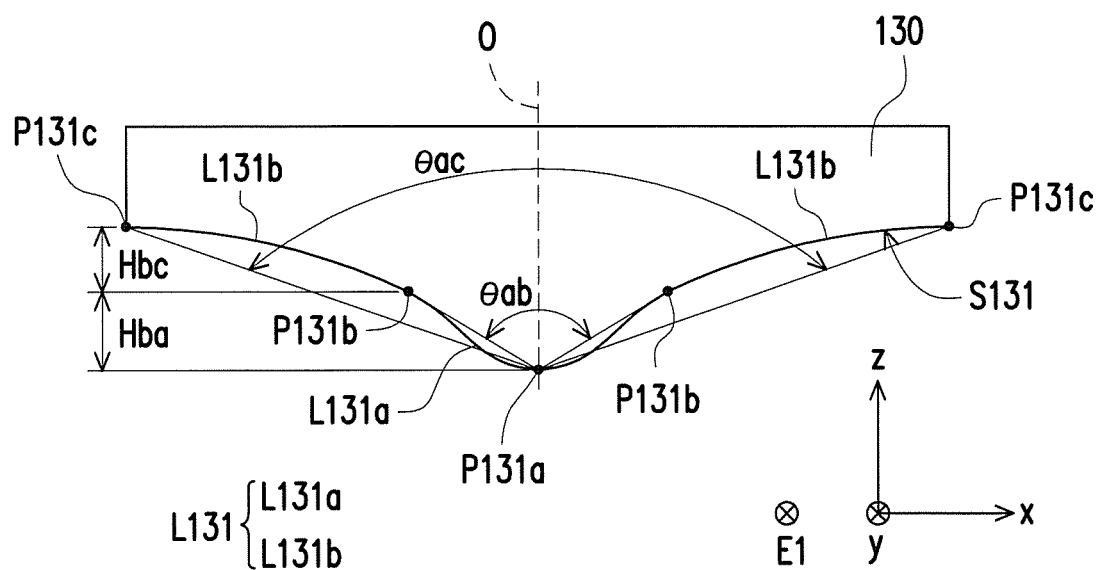
FIG. 1D is a schematic cross-sectional diagram illustrating the bar-shaped reflection unit depicted in FIG. 1A.

FIG. 1C is a schematic diagram illustrating a light path of the light source module depicted in FIG. 1A. FIG. 1D is a schematic cross-sectional diagram illustrating the bar-shaped reflection unit depicted in FIG. 1A. With reference to FIG. 1C and FIG. 1D, in the embodiment, a cross-sectional line L131 obtained by cutting the reflection surface S131 of the bar-shaped reflection unit 130 along an optical axis O of any of the light-emitting elements 111 and along a direction perpendicular to the extension direction E1 and a cross-sectional line L121 obtained by cutting the wavy reflective curved surface S121 of the reflector 120 are both free-form curves. Namely, in the embodiment, the reflection surface S131 of the bar-shaped reflection unit 130 and the wavy reflective curved surface S121 of the reflector 120 are shaped according to actual requirements, such that the light 60 provided by the light-emitting elements 111 may be converted into a planar light source with high brightness and uniform distribution. Here, a cross-sectional line obtained by cutting the reflection surface S131 of the bar-shaped reflection unit 130 along any of a plurality of reference planes perpendicular to the extension direction E1 is substantially the same as the cross-sectional line L131 obtained by cutting the reflection surface S131 of the bar-shaped reflection unit 130 along the optical axis O of any of the light-emitting elements 111 and along the direction perpendicular to the extension direction E1. However, in another embodiment of the invention, the cross-sectional line obtained by cutting the reference plane between two adjacent light-emitting elements 111 and perpendicular to the extension direction E1 may be different from the cross-sectional line L131 obtained by cutting the reflection surface S131 of the bar-shaped reflection unit 130 along the optical axis O of any of the light-emitting elements 111 and along the direction perpendicular to the extension direction E1.

Particularly, as shown in FIG. 1C, when the light-emitting elements 111 emit light, a portion of light 60 emitted from the light-emitting elements 111 may be transmitted to the bar-shaped reflection unit 130 and may then be reflected. The reflection angle of the light 60 is designed by adjusting the reflection surface S131 of the bar-shaped reflection unit 130 in the light source module 100; thereby, the light 60 and the light 70 emitted from the light-emitting elements 111 is distributed onto the reflector 120, and the light-emitting intensity of the light source module 100 is re-distributed though structural design of the wavy reflective curved surface S121 of the reflector 120.

To be specific, in the embodiment, if the width W1 of the bar-shaped reflection unit 130 increases, the reflection surface S131 is capable of adjusting the reflection angle of more of the light 60 emitted from the light-emitting elements 111, which is conducive to the adjustment of the intensity and distribution of light from the light source module 100. However, if the width W1 is excessive, the light 60 and the light 70 provided by the light-emitting elements 111 may not be able to arrive at the place above the bar-shaped reflection unit 130, and thus dark zones may be formed above the bar-shaped reflection unit 130. By contrast, if the width W1 of the bar-shaped reflection unit 130 decreases, the possibility of generating the dark zones above the bar-shaped reflection unit 140 may be reduced; however, the coverage of the light 60 which can be adjusted by the reflection surface S131 is reduced as well, and therefore the brightness of a portion of light (e.g., the light 70) which may be directly incident on the optical film 150 is enhanced. This results in apparent bright lines or bright zones.

Therefore, in the embodiment, a ratio of the width W1 of the cross-sectional line L131 along a direction perpendicular to the optical axis O to a width W2 of a light-emitting zone EA of the light-emitting elements 111 along the direction perpendicular to the extension direction E1 is larger than 2 and smaller than 7, such that the reflection angle of the light 60 from the light-emitting elements 111 may be adjusted. Besides, even though the intensity and distribution of light emitted from the light source module 100 are taken into consideration, excessive dark zones or apparent bright lines or bright zones are not generated above the bar-shaped reflection unit 130.

In the embodiment, the reflection angle of the light 60 emitted from the light-emitting elements 111 may be adjusted by means of the bar-shaped reflection unit 130 of the light source module 100, and the bar-shaped reflection unit 130 is also conducive to the design of intensity and distribution of the emitted light of the light source module 100. Hence, when the distance from the bar-shaped substrate 113 to the optical film 150 decreases, i.e., the thickness of the optical cavity is reduced, the bright lines or bright zones are not generated right above the light-emitting elements 111. As a result, with the thin optical cavity, the light intensity and distribution still stay uniform, and the light 60 and the light 70 provided by the light-emitting elements 111 may be converted into the planar light source characterized by high brightness and uniformity of light distribution.

As shown in FIG. 1C, according to the embodiment, the bar-shaped substrate 113 has a first surface S113a facing the bar-shaped reflection unit 130 and a second surface S113b facing away from the bar-shaped reflection unit 130. Particularly, a height h113a1 of the first surface S113a in a direction parallel to the optical axis O is substantially equal to a height h121 of the lowest point of the wavy reflective curved surface S121 in the direction parallel to the optical axis O. Besides, an included angle φa between the optical axis O and a tangent line C121a of an end on the reflective convex surfaces S121a of the reflector 120 closest to the light bar 110 is larger than 0 degree and smaller than 45 degrees, and the tangent line C121a is on a reference plane RS perpendicular to the extension direction E1. In the embodiment, the reference plane RS is parallel to the x-z plane, for instance. Thereby, when the light-emitting elements 111 emit light, the light 60 that is reflected by the reflective convex surfaces S121a of the reflector 120 and transmitted to the place above the bar-shaped reflection unit 130 may have the enhanced brightness, and the possibility of generating dark zones above the bar-shaped reflection unit 130 may be reduced. Note that the numerical range provided here is exemplary and is not intended to limit the scope of the invention.

With reference to FIG. 1C and FIG. 1D, the cross-sectional line L131 obtained by cutting the reflection surface S131 of the bar-shaped reflection unit 130 along the optical axis O of any of the light-emitting elements 111 and along the direction perpendicular to the extension direction E1 includes a convex arc line L131a and two concave arc lines L131b. The convex arc line L131a protrudes toward the light-emitting elements 111. The two concave arc lines L131b are connected to two opposite ends of the convex arc line L131a. Additionally, in the embodiment of the invention, an included angle θac between two connection lines respectively connecting an apex P131a of the convex arc line L131a to two opposite ends P131c of the cross-sectional line L131 is greater than or substantially equal to an included angle θab between two connection lines respectively connecting the apex P131a of the convex arc line L131a to two opposite half height waist points P131b of the cross-sectional line L131, wherein a distance Hba from each of the opposite half height waist points P131b to the apex P131a in a direction parallel to the optical axis O is substantially equal to a distance Hbc from each of the opposite half height waist points P131b to the two opposite ends P131c of the cross-sectional line L131 in the direction parallel to the optical axis O.

Specifically, if the included angles θab and θac decrease, the reflection surface S131 of the bar-shaped reflection unit 130 may reflect the light 60 provided by the light-emitting elements 111 to the portion of the reflector 120 which is farther away from the light-emitting elements 111. On the other hand, if the included angles θab and θac increase, the reflection surface S131 of the bar-shaped reflection unit 130 may reflect the light 60 provided by the light-emitting elements 111 to the portion of the reflector 120 which is closer to the light-emitting elements 111. Nevertheless, if the relative positions of the light-emitting elements 111 and the bar-shaped reflection unit 130 are deviated, and variations in the slope of the reflection surface S131 of the bar-shaped reflection unit 130 do not stay continuous, e.g., if the reflection surface S131 of the bar-shaped reflection unit 130 has a sharp tip like the corner of a prism, the light intensity and distribution at two sides of the bar-shaped reflection unit 130 may be asymmetrical.

To prevent said issue, the variations in the slope of the reflection surface S131 of the bar-shaped reflection unit 130 may be designed to be continuous according to the embodiment. That is, as shown in FIG. 1D, the reflection surface S131 of the bar-shaped reflection unit 130 is a smooth curved surface in the embodiment, and the cross-sectional line L131 obtained by cutting the reflection surface S131 of the bar-shaped reflection unit 130 along the optical axis O of any of the light-emitting elements 111 and along the direction perpendicular to the extension direction E1 is also a smooth curve. Thereby, said issue (i.e., the impact on the light intensity) caused by the deviated relative positions of the light-emitting elements 111 and the bar-shaped reflection unit 130 may be resolved, and the asymmetrical light intensity and distribution at the two sides of the bar-shaped reflection unit 130 may be prevented.

In the embodiment, the included angle θac is greater than or substantially equal to the included angle θab, the light 60 reflected by the bar-shaped reflection unit 130 may be mostly transmitted to the reflector 120. Thereby, the intensity of the light 70 directly reflected by the bar-shaped reflection unit 130 to the optical film 150 may be reduced, and the possibility of generating partial bright zones or bright lines may be lessened. Particularly, in the embodiment, the included angle Sac between two connection lines respectively connecting the apex P131a of the convex arc line L131a to two opposite ends P131c of the cross-sectional line L131 is larger than 120 degrees and smaller than 150 degrees. The included angle θab between two connection lines respectively connecting the apex P131a of the convex arc line L131a to two opposite half height waist points P131b of the cross-sectional line L131 is larger than 100 degrees and smaller than 150 degrees. Note that the numerical range provided here is exemplary and is not intended to limit the scope of the invention.

Figure 1E:
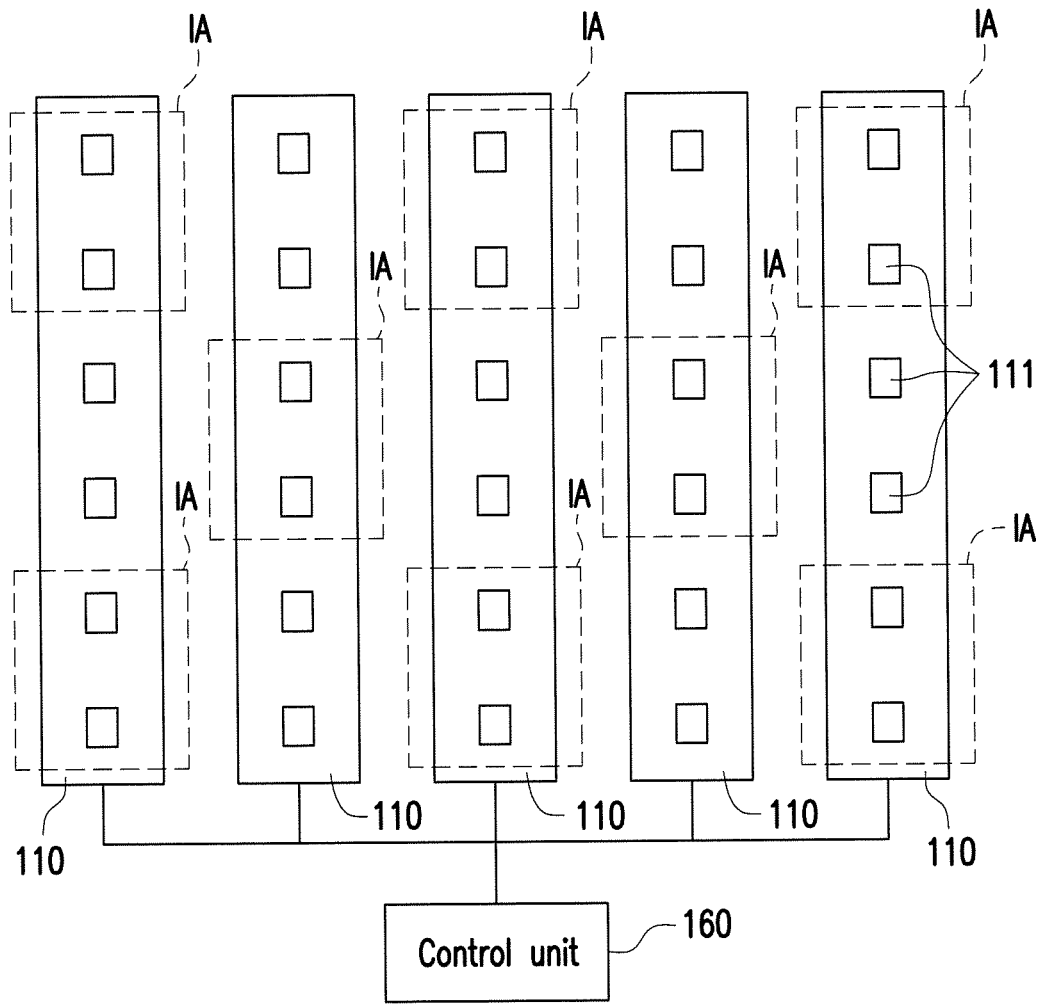
FIG. 1E is a schematic diagram illustrating structures of the light bar and the control unit depicted in FIG. 1A.

FIG. 1E is a schematic diagram illustrating structures of the light bar and the control unit depicted in FIG. 1A. As shown in FIG. 1E, in the embodiment, the light source module 100 further includes a control unit 160. The control unit 160 is electrically connected to the light bars 110 and configured to regionally adjust brightness or chroma coordinates of the light-emitting elements 111 in different regions of the light bars 110. For instance, in the light source module 100 shown in FIG. 1E, the light bars 110 may be divided into a plurality of different regions, and the control unit 160 allows the light-emitting elements 111 in the region IA (surrounded by dotted lines) to emit light but do not allow the light-emitting elements 111 in regions other than the region IA to emit light, so as to form the bright and dark regions having the checkerboard pattern. As such, the light source module 100 is capable of performing the local dimming function. In the embodiment, when a LCD is equipped with the light source module 100, and the light source module 100 performs the local dimming function, the brightness distribution of the light source module 100 may be adjusted in a region-by-region manner according to the images displayed on the LCD. In comparison with the condition that the light source module 100 does not perform the local dimming function, the brightness contrast of the LCD is at least four times greater if the light source module 100 performs the local dimming function. Namely, in the embodiment, if the light source module 100 performs the local dimming function, the contrast of the LCD can be increased by at least four times, which should however not be construed as a limitation to the invention. Besides, different regions in the reflector 120 described herein have different heights, as shown in FIG. 1C; therefore, when the light-emitting elements 111 at different regions emit light, the light 60 and the light 70 are not apt to be transmitted to adjacent regions. As such, the contrast can be enhanced while the local dimming function is performed.

With reference to FIG. 1C and FIG. 1E, in order to perform the local dimming function, circuits are required to be placed on the bar-shaped substrate 110 in the light source module 100, such that the control unit 160 is allowed to control the light-emitting elements 111 in each region. Hence, in the embodiment, the width W3 of the bar-shaped substrate 113 along the direction perpendicular to the extension direction E1 and along the direction perpendicular to the optical axis O may be greater than the width W1 of the bar-shaped reflection unit 130 along the direction perpendicular to the extension direction E1 and along the direction perpendicular to the optical axis O, which is conducive to the configuration of the circuits.

Figure 2:
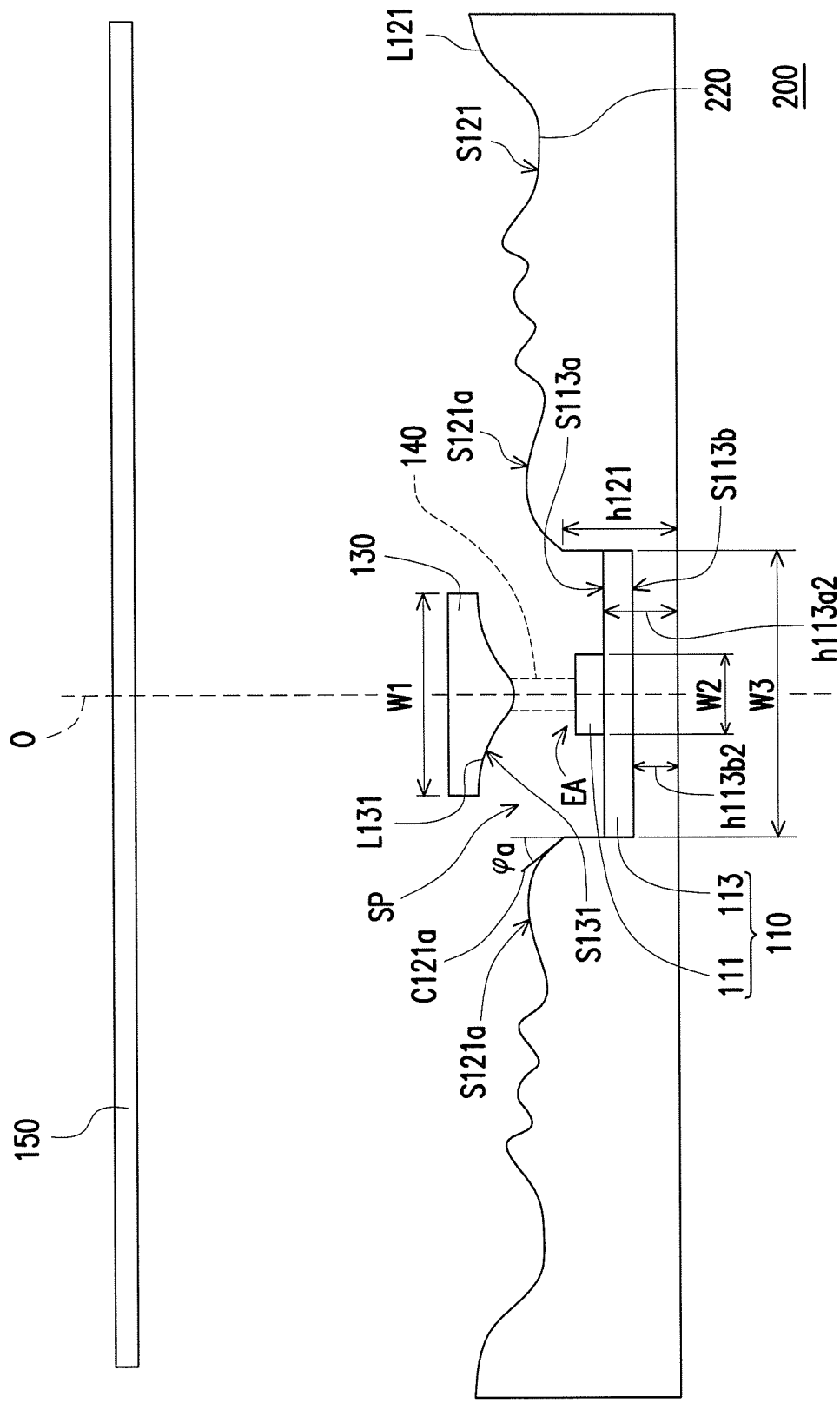
FIG. 2 is a schematic cross-sectional diagram illustrating a light source module according to another embodiment of the invention.

FIG. 2 is a schematic cross-sectional diagram illustrating a light source module according to another embodiment of the invention. The light source module 200 provided in the embodiment is similar to the light source module 100 depicted in FIG. 1B, and the difference between the two light source modules 200 and 100 is described below. With reference to FIG. 2, the height h113a2 of the first surface S113a in the direction parallel to the optical axis O is within a range between the height h121 of the lowest point of the wavy reflective curved surface S121 in the direction parallel to the optical axis O and the height h113b2 of the second surface S113b in the direction parallel to the optical axis O. Thereby, when the light-emitting elements 111 emit light, the light that is reflected by the reflective convex surfaces S121a of the reflector 220 and transmitted to the place above the bar-shaped reflection unit 130 may have the enhanced brightness, and the possibility of generating dark zones above the bar-shaped reflection unit 130 may be reduced. Through a modification of the reflection surface S131 of the bar-shaped reflection unit 130 in the light source module 200 described in the embodiment, the reflection angles of the light 60 and the light 70 may also be changed to adjust the intensity and distribution of the light emitted from the light source module 200. Hence, the effects and the advantages of the light source module 100 may also be guaranteed in the light source module 200 and thus will not be further elaborated.

Figure 3:
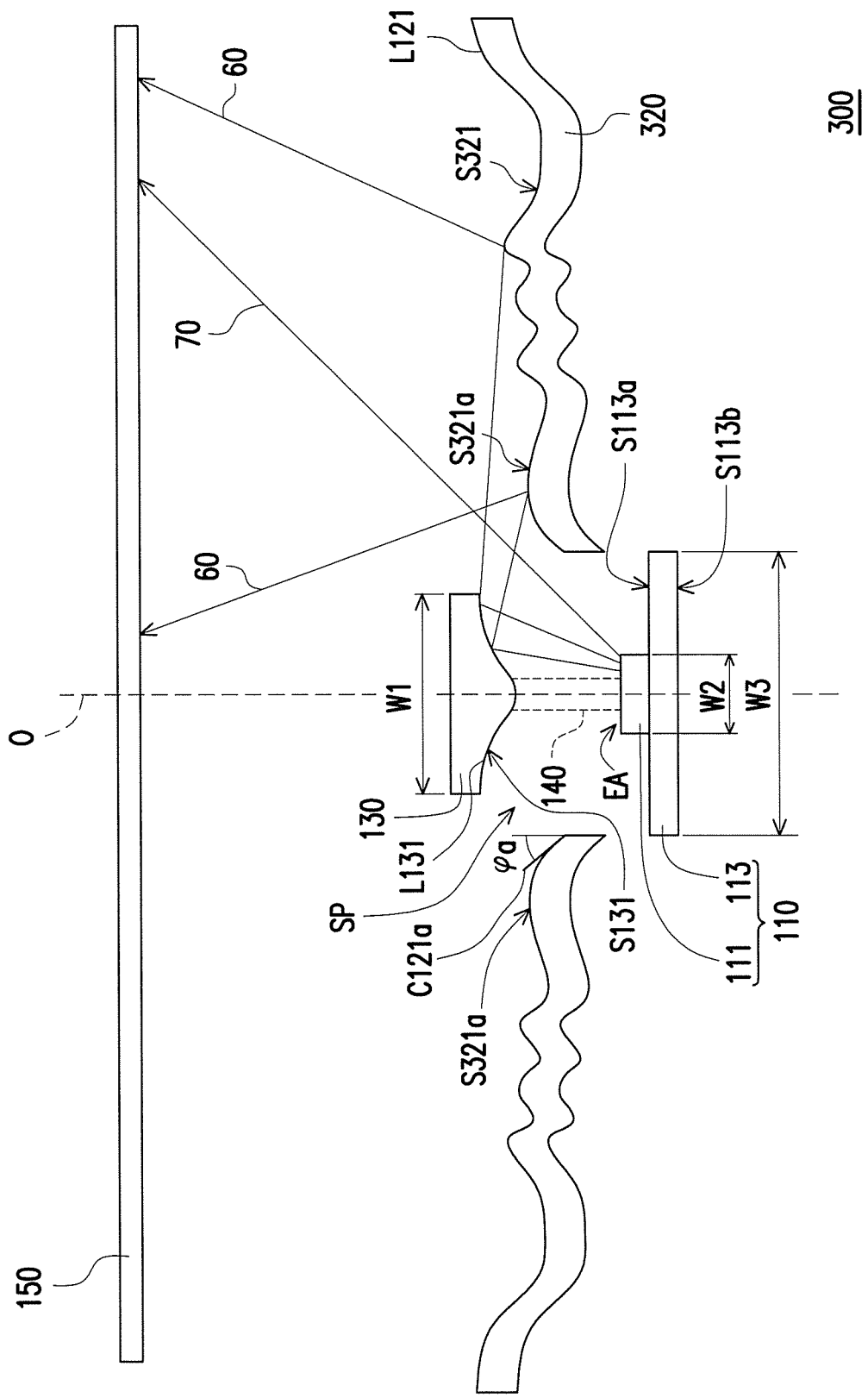
FIG. 3 is a schematic cross-sectional diagram illustrating a light source module according to yet another embodiment of the invention.

FIG. 3 is a schematic cross-sectional diagram illustrating a light source module according to yet another embodiment of the invention. The light source module 300 provided in the embodiment is similar to the light source module 100 depicted in FIG. 1B, and the difference between the two light source modules 300 and 100 is described below. With reference to FIG. 3, in the embodiment, the accommodation space SP is an accommodation opening, and the reflector 320 has a thickness. Besides, in the embodiment, the height of the first surface S113a of the bar-shaped substrate 113 in the direction parallel to the optical axis O is within a range between the height of the lowest point of the wavy reflective curved surface S321 in the direction parallel to the optical axis O and the height of the second surface S113b in the direction parallel to the optical axis O. Therefore, when the light-emitting elements 111 emit light, the light 60 that is reflected by the reflective convex surfaces S321a of the reflector 320 and transmitted to the place above the bar-shaped reflection unit 130 may have the enhanced brightness, and the possibility of generating dark zones above the bar-shaped reflection unit 130 may be reduced. Through the reflection surface S131 of the bar-shaped reflection unit 130 in the light source module 300 described in the embodiment, the reflection angles of the light 60 and the light 70 may also be determined to adjust the intensity and distribution of the light emitted from the light source module 300. Hence, the effects and the advantages of the light source module 100 may also be guaranteed in the light source module 300 and thus will not be further elaborated.

Figure 4A:
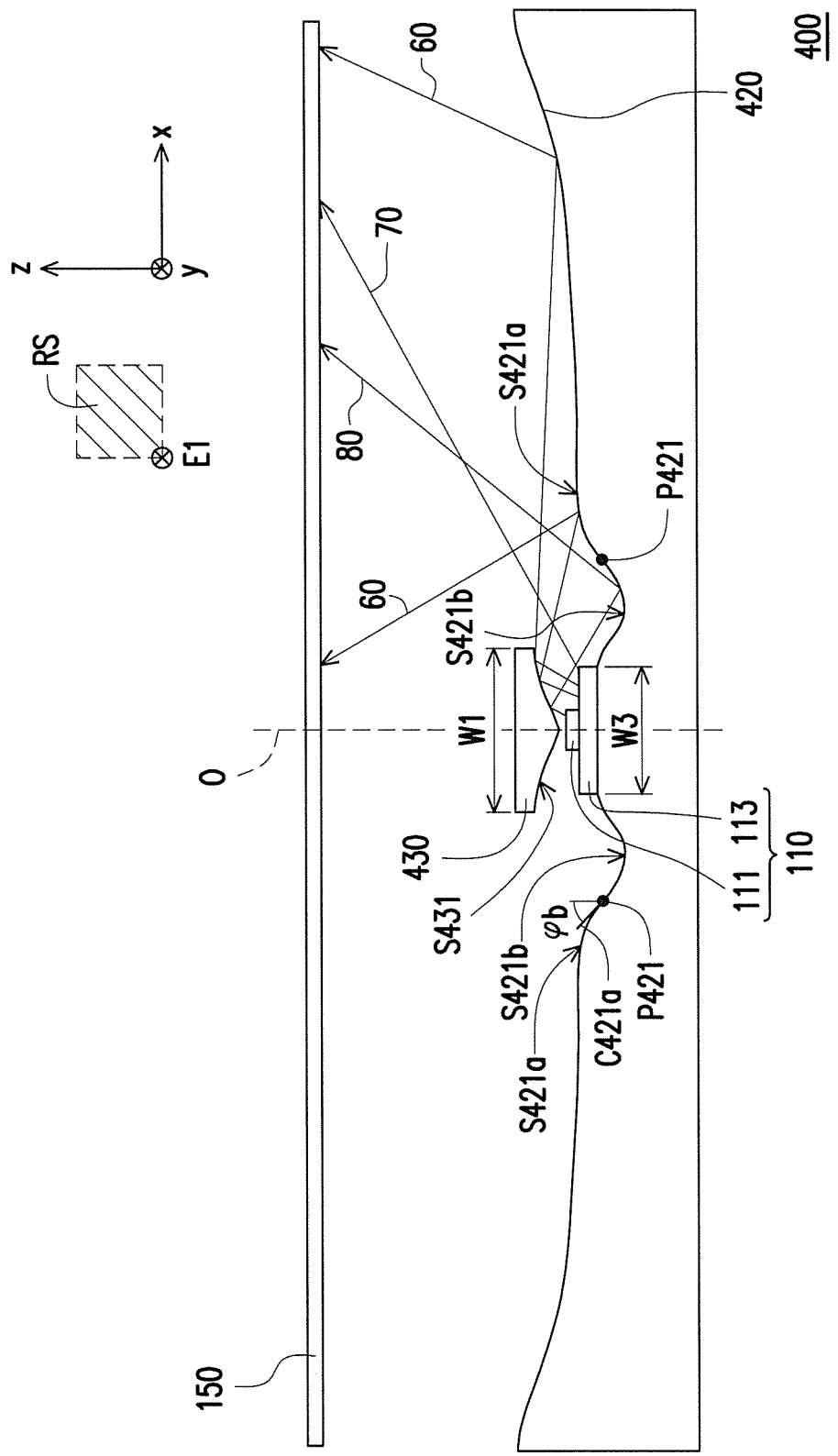
FIG. 4A is a schematic cross-sectional diagram illustrating a light source module according to yet another embodiment of the invention.
Figure 4B:
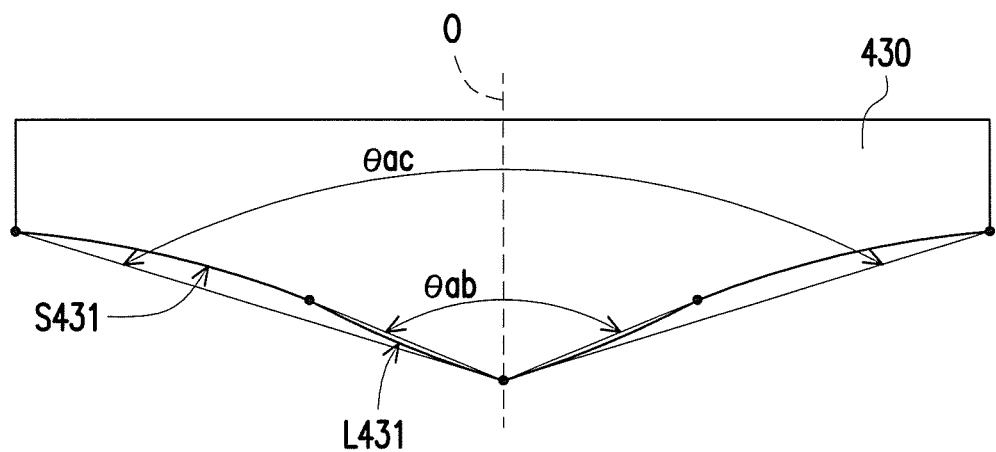
FIG. 4B is a schematic cross-sectional diagram illustrating the bar-shaped reflection unit depicted in FIG. 4A.

FIG. 4A is a schematic cross-sectional diagram illustrating a light source module according to yet another embodiment of the invention. FIG. 4B is a schematic cross-sectional diagram illustrating the bar-shaped reflection unit depicted in FIG. 4A. The light source module 400 provided in the embodiment is similar to the light source module 100 depicted in FIG. 1B, and the difference between the two light source modules 400 and 100 is described below. With reference to FIG. 4A and FIG. 4B, in the embodiment, a cross-sectional line L431 is obtained by cutting the reflection surface S431 of the bar-shaped reflection unit 430 along an optical axis O of any of the light-emitting elements 111 and along the direction perpendicular to the extension direction E1, and variations in the slope of the reflection surface S431 of the bar-shaped reflection unit 430 are rather moderate in comparison with the variations in the slope of the reflection surface S131 of the bar-shaped reflection unit 130 shown in FIG. 1D. That is, the difference between the included angles θab and θac is relatively insignificant. In addition, the reflector 420 further has two reflective concave surfaces S421b connected to the two opposite sides of the light bar 110. Each of the reflective concave surfaces S421b is connected between one of the reflective convex surfaces S421a and the light bar 110, an included angle φb between the optical axis O and the tangent lines C421a of the junction (i.e., each of the inflection points P421 on the curved surface of the reflector 420) between each of the reflective concave surfaces S421b and the corresponding reflective convex surface S421a is larger than 45 degrees and smaller than 70 degrees, and the tangent lines C421a are on a reference plane RS perpendicular to the extension direction E1. In the embodiment, the reference plane RS is parallel to the x-z plane, for instance. When the light-emitting elements 111 emit light, a portion of light 80 emitted from the light-emitting elements 111 is reflected by the bar-shaped reflection unit 430 or the reflective concave surfaces S421b of the reflector 420 and is then transmitted to a place away from the light-emitting elements 111. Thereby, the distance between two adjacent light bars 110 may be increased, the number of the required light bars 110 may be reduced, the number of the light-emitting elements 111 may be correspondingly reduced, and the product costs may be lowered down.

In the embodiment, the reduced number of the light-emitting elements 111 results in the reduced number of the required circuits on the bar-shaped substrate 113. Hence, the width W3 of the bar-shaped substrate 113 in the direction perpendicular to the extension direction E1 may be larger than or smaller than the width W1 of the bar-shaped reflection unit 430 in the direction perpendicular to the extension direction E1. In FIG. 4A, the width W3 is smaller than the width W1. Besides, through a modification of the reflection surface S431 of the bar-shaped reflection unit 430 in the light source module 400 described in the embodiment, the reflection angles of the light 60, the light 70, and the light 80 may also be changed to adjust the intensity and distribution of the light emitted from the light source module 400. Hence, the effects and the advantages of the light source module 100 may also be guaranteed in the light source module 400 and thus will not be further elaborated.

Figure 5A:
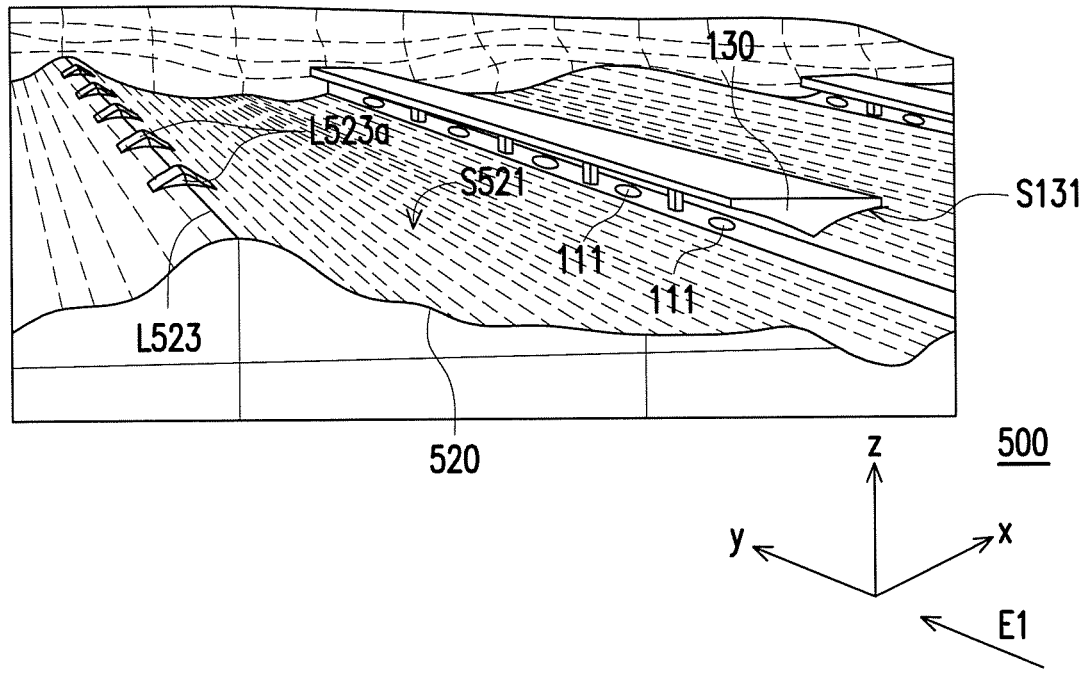
FIG. 5A is a schematic three-dimensional diagram illustrating a portion of a light source module according to another embodiment of the invention.
Figure 5B:
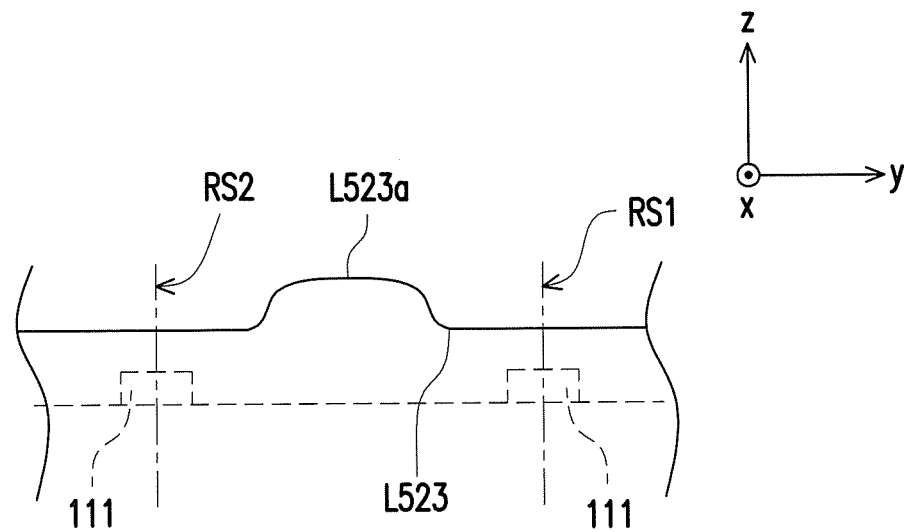
FIG. 5B is a schematic cross-sectional diagram illustrating the light source module depicted in FIG. 5A.
Figure 5C:
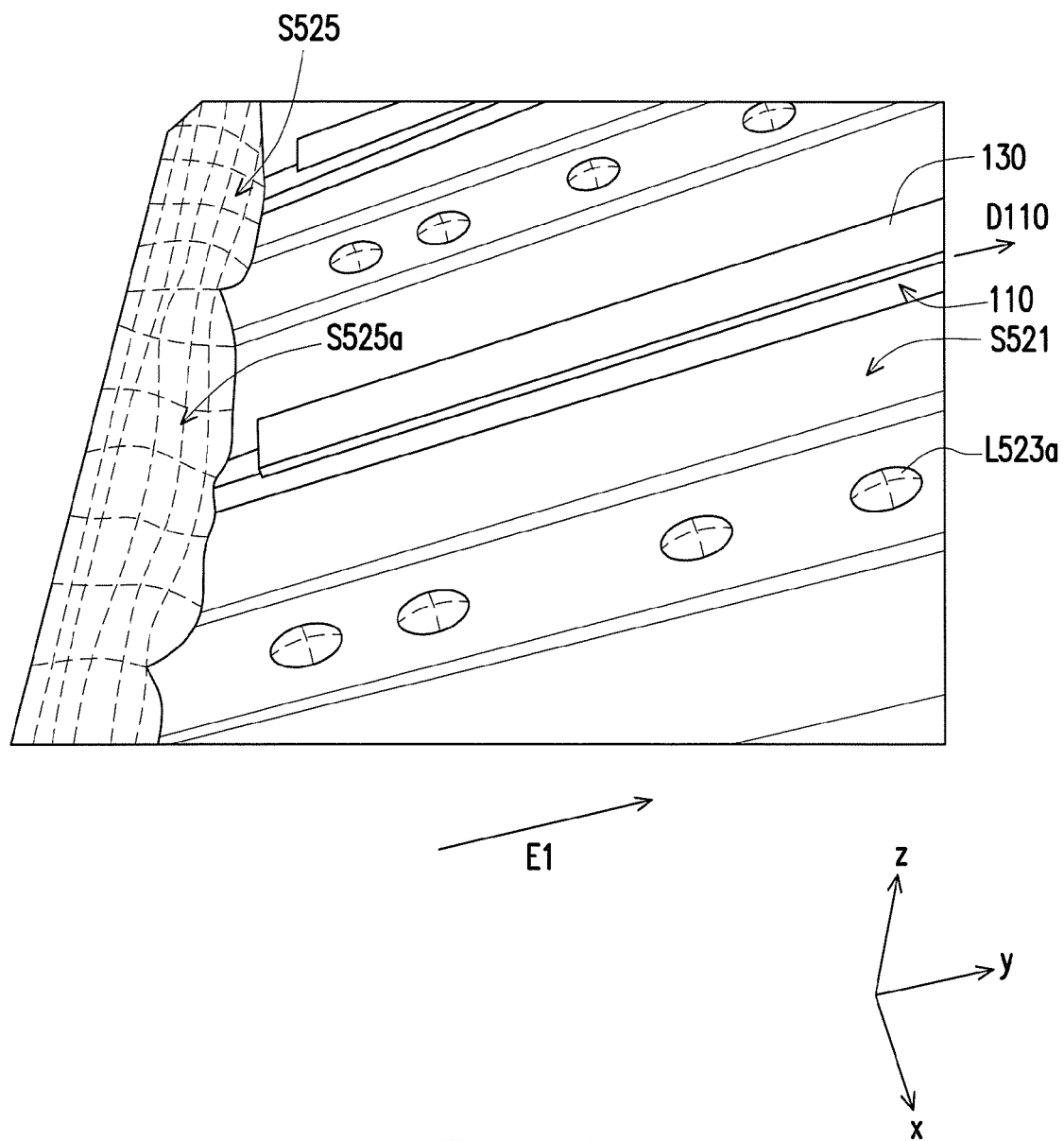
FIG. 5C is a schematic diagram illustrating a portion of the edge curved surface depicted in FIG. 5A.

FIG. 5A is a schematic three-dimensional diagram illustrating a portion of a light source module according to another embodiment of the invention. FIG. 5B is a schematic cross-sectional diagram illustrating the light source module depicted in FIG. 5A. FIG. 5C is a schematic three-dimensional diagram illustrating the edge curved surface depicted in FIG. 5A. The light source module 500 provided in the embodiment is similar to the light source module 100 depicted in FIG. 1A, and the difference between the two light source modules 500 and 100 is described below. With reference to FIG. 5A and FIG. 5B, in the embodiment, the wavy reflective curved surface S521 of the reflector 520 has at least one ridge line L523, and the ridge line L523 has a plurality of protrusions L523a arranged along the extension direction E1. As shown in FIG. 5B, each of the protrusions L523a is located between two reference planes RS1 and RS2 passing two adjacent light-emitting elements 111 and standing perpendicular to the extension direction E1. When the light-emitting elements 111 emit light, a portion of the light emitted from the light-emitting elements 111 is transmitted to the protrusions L523a and is then reflected, so as to improve the overall brightness and light distribution uniformity of the light source module 500. Moreover, in the embodiment, issues of partial bright zones and hot spots may be resolved by means of the protrusions L523a in the light source module 500, and thus the distance between two adjacent light-emitting elements 111 can be relatively long. As such, the number of the required light-emitting elements 111 may be reduced, so as to further lower down the product costs.

With reference to FIG. 5B and FIG. 5C, in the embodiment, the reflector 520 has at least one edge curved surface S525. The at least one edge curved surface S525 extends perpendicularly to the extension direction E1 and is located next to an end of the light bar 110 in an elongate direction D110, and the at least one edge curved surface S525 is connected to one side of the wavy reflective curved surface S521. In this embodiment, the elongate direction D110 is, for instance, a y direction. A portion of the edge curved surface S525 corresponding to the end of the light bar 110 is a concave curved surface S525a. When the light-emitting elements 111 emit light, a portion of the light emitted from the light-emitting elements 111 is transmitted to the concave curved surface S525a and is then reflected, so as to ensure the light distribution uniformity of the edge portion of the light source module 500 and simultaneously reduce the number of the required light-emitting elements 111. The protrusions L523a may be arranged along the extension direction E1 in an equidistant or non-equidistant manner, so as to adjust the overall brightness and light distribution uniformity of the light source module 500. With reference to FIG. 5C, the distance among the protrusions L523a on the edge portion is rather small, and the distance among the protrusions L523a away from the edge portion is rather large. Thereby, the number of the required light-emitting elements 111 may be reduced, and simultaneously the light distribution uniformity of the edge portion of the light source module 500 may be ensured. Through a modification of the reflection surface S131 of the bar-shaped reflection unit 130 in the light source module 500 described in the embodiment, the reflection angles of the light 60 and the light 70 may also be changed to adjust the intensity and distribution of the light emitted from the light source module 500. Hence, the effects and the advantages of the light source module 100 may also be guaranteed in the light source module 500 and thus will not be further elaborated.

To sum up, the light source module described in the embodiments of the invention may have at least one of the following advantages. The reflection angle of light may be determined by means of the reflection surface of the bar-shaped reflection unit in the light source module described herein, such that the light emitted from the light-emitting elements is distributed onto the reflector. Besides, through the structural design of the wavy reflective curved surface of the reflector, the intensity and distribution of light emitted from the light source module may be adjusted; hence, in case of the thin optical cavity, the uniformity of the light distribution and favorable light intensity may be ensured, and the light provided by the light-emitting elements may be converted into the planar light source with high brightness and uniform distribution. Moreover, owing to the control unit, the brightness of the light-emitting elements in different regions of the light bars may be regionally adjusted, such that the light source described herein is capable of performing the local dimming function. In another aspect, the structurally curved design of the reflective surface of the bar-shaped reflection unit and the wavy reflective curved surface of the reflector allows the light source module to have the improved overall brightness and uniform light distribution. At the same time, the number of the required light bars can be reduced, or the distance among the light bars is not required to be small. Alternatively, when the overall brightness and the uniformity of light distribution of the light source are improved, the number of the required light-emitting elements can be reduced, and the distance among the light-emitting elements is not required to be small. Thereby, the product costs may be lowered down.

The foregoing description of the exemplary embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:

1. A light source module comprising at least one light bar, a reflector, and at least one bar-shaped reflection unit, wherein
    the at least one light bar comprises a plurality of light-emitting elements arranged along an extension direction,
    the reflector has at least one accommodation space accommodating the at least one light bar and a plurality of reflective convex surfaces located on two opposite sides of the at least one light bar, and
    the at least one bar-shaped reflection unit is located above the at least one light bar, extends along the extension direction, and has a reflection surface facing the light bar, wherein a cross-sectional line obtained by cutting the reflection surface of the at least one bar-shaped reflection unit along an optical axis of any of the light-emitting elements and along a direction perpendicular to the extension direction includes a convex arc line protruding toward the light-emitting elements and two concave arc lines connected to two opposite ends of the convex arc line.

2. The light source module as recited in claim 1, wherein a ratio of a width of the cross-sectional line along a direction perpendicular to the optical axis to a width of a light-emitting zone of the light-emitting elements along the direction perpendicular to the extension direction is larger than 2 and smaller than 7.

3. The light source module as recited in claim 2, wherein the at least one light bar further comprises a bar-shaped substrate extending along the extension direction and holding the light-emitting elements, and a width of the bar-shaped substrate along the direction perpendicular to the extension direction is greater than a width of the at least one bar-shaped reflection unit along the direction perpendicular to the extension direction.

4. The light source module as recited in claim 1, wherein an included angle between two connection lines respectively connecting an apex of the convex arc line to two opposite ends of the cross-sectional line is greater than or equal to an included angle between two connection lines respectively connecting the apex of the convex arc line to two opposite half height waist points of the cross-sectional line, and a distance from each of the opposite half height waist points to the apex in a direction parallel to the optical axis is equal to a distance from the each of the opposite half height waist points to the two opposite ends of the cross-sectional line in the direction parallel to the optical axis.

5. The light source module as recited in claim 1, wherein an included angle between two connection lines respectively connecting an apex of the convex arc line to two opposite ends of the cross-sectional line is larger than 120 degrees and smaller than 150 degrees.

6. The light source module as recited in claim 1, wherein an included angle between two connection lines respectively connecting an apex of the convex arc line to two opposite half height waist points of the cross-sectional line is larger than 100 degrees and smaller than 150 degrees, and a distance from each of the opposite half height waist points to the apex in a direction parallel to the optical axis is equal to a distance from the each of the opposite half height waist points to the two opposite ends of the cross-sectional line in the direction parallel to the optical axis.

7. The light source module as recited in claim 1, wherein an included angle between the optical axis and a tangent line of an end on the reflective convex surface of the reflector closest to the at least one light bar is larger than 0 degree and smaller than 45 degrees, and the tangent line is on a reference plane perpendicular to the extension direction.

8. The light source module as recited in claim 1, wherein the at least one light bar further comprises a bar-shaped substrate extending along the extension direction and holding the light-emitting elements.

9. The light source module as recited in claim 8, wherein the bar-shaped substrate has a first surface facing the at least one bar-shaped reflection unit and a second surface facing away from the at least one bar-shaped reflection unit, the reflector has a wavy reflective curved surface comprising the reflective convex surfaces and a plurality of reflective concave surfaces, and a height of the first surface of the bar-shaped substrate in a direction parallel to the optical axis is within a range between a height of a lowest point of the wavy reflective curved surface in the direction parallel to the optical axis and a height of the second surface of the bar-shaped substrate in the direction parallel to the optical axis or is equal to the height of the lowest point of the wavy reflective curved surface in the direction parallel to the optical axis.

10. The light source module as recited in claim 8, further comprising an optical film, wherein the at least one bar-shaped reflection unit is located between the optical film and the at least one light bar.

11. The light source module as recited in claim 10, wherein a distance from the at least one bar-shaped reflection unit to the optical film is greater than one third of a distance from the bar-shaped substrate to the optical film.

12. The light source module as recited in claim 1, wherein the reflector further has two reflective concave surfaces connected to the two opposite sides of the at least one light bar, each of the reflective concave surfaces is connected between one of the reflective convex surfaces and the at least one light bar, an included angle between the optical axis and a tangent line of a junction of each of the reflective concave surfaces and the corresponding reflective convex surface is larger than 45 degrees and smaller than 70 degrees, and the tangent line is on a reference plane perpendicular to the extension direction.

13. The light source module as recited in claim 12, wherein the at least one light bar further comprises a bar-shaped substrate extending along the extension direction and holding the light-emitting elements, and a width of the bar-shaped substrate along the direction perpendicular to the extension direction is smaller than a width of the at least one bar-shaped reflection unit along the direction perpendicular to the extension direction.

14. The light source module as recited in claim 1, wherein the reflector has a wavy reflective curved surface comprising the reflective convex surfaces and a plurality of reflective concave surfaces, the wavy reflective curved surface has at least one ridge line, the at least one ridge line has a plurality of protrusions arranged along the extension direction, and each of the protrusions is located between two reference planes passing two adjacent light-emitting elements of the light-emitting elements and standing perpendicular to the extension direction.

15. The light source module as recited in claim 1, wherein the reflector comprise:
a wavy reflective curved surface comprising the reflective convex surfaces and a plurality of reflective concave surfaces; and
at least one edge curved surface extending perpendicularly to the extension direction, connected to a side of the wavy reflective curved surface, and located next to an end of the at least one light bar in an elongate direction, wherein a portion of the at least one edge curved surface corresponding to the end of the at least one light bar is a concave curved surface.

16. The light source module as recited in claim 1, wherein the accommodation space is an accommodation recess or an accommodation opening.

17. The light source module as recited in claim 1, further comprising a plurality of support units connected to the at least one light bar and the at least one bar-shaped reflection unit, each of the support units being located between two adjacent light-emitting elements of the light-emitting elements.

18. The light source module as recited in claim 1, wherein the number of the at least one light bar is plural, the number of the at least one bar-shaped reflection unit is plural, the light bars are arranged along the direction perpendicular to the extension direction, and the bar-shaped reflection units are arranged along the direction perpendicular to the extension direction.

19. The light source module as recited in claim 18, further comprising a control unit electrically connected to the light bars and configured to regionally adjust brightness of the light-emitting elements in different regions of the light bars.

20. The light source module as recited in claim 1, wherein the reflection surface of the at least one bar-shaped reflection unit is a specular reflection surface, the reflector has a wavy reflective curved surface comprising the reflective convex surfaces and a plurality of reflective concave surfaces, and the wavy reflective curved surface is a diffusive reflection surface.

* * * * *